(12) United States Patent
Seibold

(10) Patent No.: US 7,111,413 B2
(45) Date of Patent: Sep. 26, 2006

(54) PRECISION DISTANCE-MEASURING INSTRUMENT

(75) Inventor: Wolfgang Seibold, Tübingen (DE)

(73) Assignee: Carl Mahr Holding GmbH, Gottingen (DE)

(*) Notice: Subject to any disclaimer, the term of this patent is extended or adjusted under 35 U.S.C. 154(b) by 0 days.

(21) Appl. No.: 11/053,148

(22) Filed: Feb. 9, 2005

(65) Prior Publication Data

US 2005/0172508 A1 Aug. 11, 2005

(30) Foreign Application Priority Data

Feb. 11, 2004 (DE) ............... 10 2004 006 672

(51) Int. Cl.
*G01B 3/18* (2006.01)
(52) U.S. Cl. .................... 33/831; 33/813; 33/820
(58) Field of Classification Search ........... 33/813, 33/818, 819, 820, 831
See application file for complete search history.

(56) References Cited

U.S. PATENT DOCUMENTS

| 4,207,679 | A | * | 6/1980 | Poage | 33/819 |
| 4,255,861 | A | * | 3/1981 | Nakata et al. | 33/819 |
| 4,578,868 | A | * | 4/1986 | Sasaki et al. | 33/819 |
| 5,829,155 | A | * | 11/1998 | Takahashi et al. | 33/813 |
| 6,243,965 | B1 | * | 6/2001 | Zanier et al. | 33/831 |
| 6,247,244 | B1 | * | 6/2001 | Zanier et al. | 33/819 |
| 2004/0250439 | A1 | * | 12/2004 | Hayashida et al. | 33/813 |

FOREIGN PATENT DOCUMENTS

| DE | 29 25 069 | | 1/1980 |
| DE | 34 32 405 | C2 | 5/1993 |
| DE | 197 19 905 | A1 | 11/1997 |
| DE | 100 35 192 | C1 | 10/2001 |
| DE | 697 05 441 | T2 | 5/2002 |
| EP | 0 182 085 | B1 | 4/1992 |
| EP | 0 947 801 | A2 | 10/1999 |
| EP | 0 785 415 | B1 | 5/2000 |
| JP | 2005003441 | A * | 1/2005 |
| JP | 2005227285 | A * | 8/2005 |

* cited by examiner

*Primary Examiner*—R. Alexander Smith
(74) *Attorney, Agent, or Firm*—Venable LLP; Stuart I. Smith

(57) ABSTRACT

A distance measuring instrument has a measuring axis; a measuring spindle disposed rotatably and shiftably in a housing such that a rotary motion of the measuring spindle results in a corresponding shift of the measuring spindle along the measuring axis; a stationary sensor element which is immobile relative to the housing and a movable sensor element which is connected to the measuring spindle to rotate therewith and which is shiftable relative to the measuring spindle along the measuring axis; and a guiding device for guiding the relative shifting motion between the movable sensor element and the measuring spindle, and having a guiding sleeve connected to the movable sensor element for rotation therewith; the guiding sleeve has an inner groove which extends parallel to the measuring axis and a guiding member which is connected to the measuring spindle for rotation therewith and which projects shiftably into the inner groove.

22 Claims, 4 Drawing Sheets

PRECISION DISTANCE-MEASURING INSTRUMENT

Figure 1:
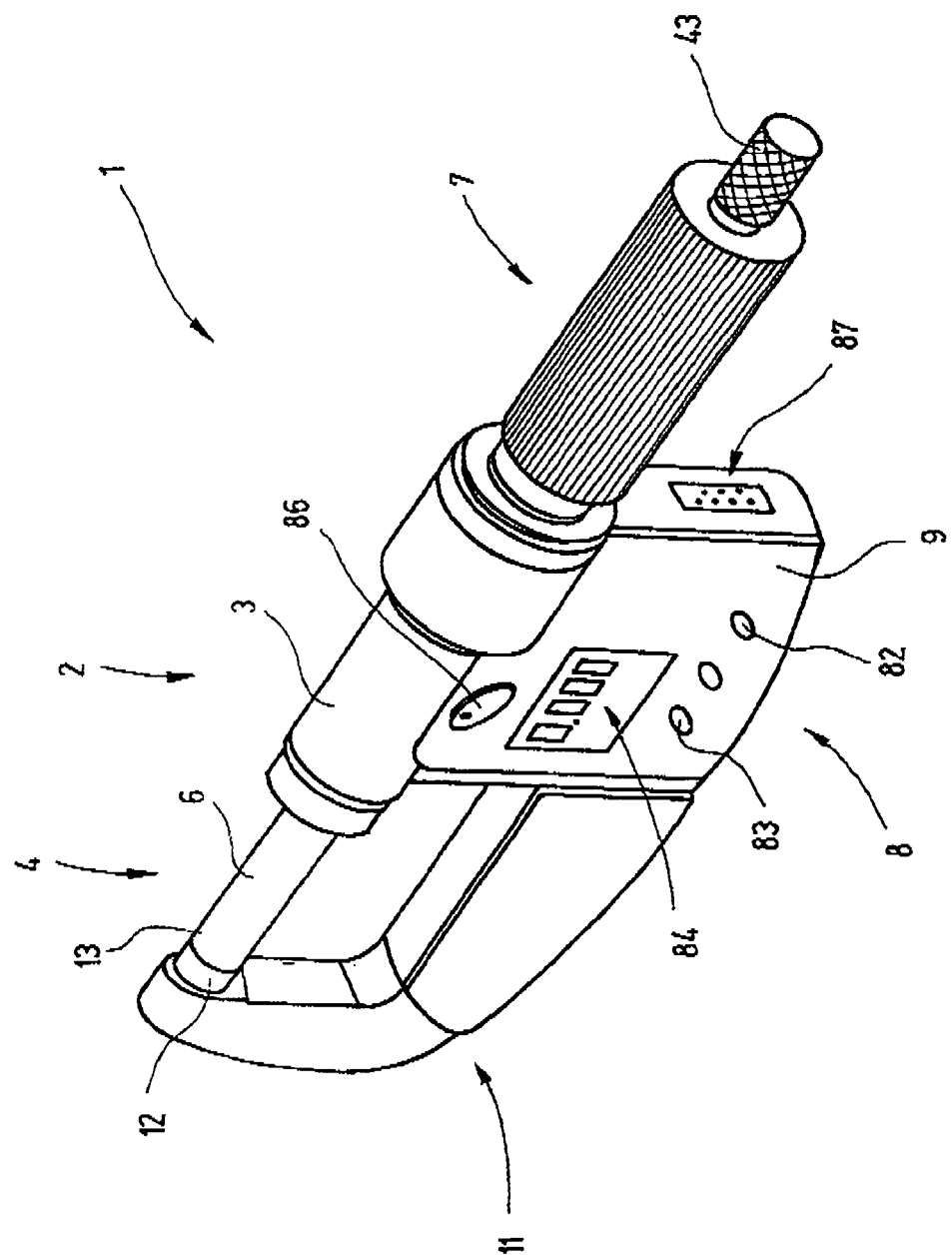

This invention relates to a precision distance-measuring instrument which may be structured particularly as an electronic micrometer.

A precision measuring instrument, referred to as an internal thread micrometer or micrometer gauge, which includes a threaded measuring spindle is well known in practice. The measuring spindle is screwed into a screw-in sleeve affixed to the micrometer housing. A circular-cylindrical portion of the measuring spindle projects from the housing and has at its free terminus an axial end face serving as a measuring face. The housing carries an L-shaped yoke, on which an anvil is provided in alignment with the measuring spindle. The anvil has a planar reference face. The measuring spindle may be manually turned by a barrel-like grip secured to that end of the measuring spindle which is remote from the measuring face. By virtue of this arrangement the measuring spindle is simultaneously displaced in the direction of the rotary axis.

Micrometers are used in operational and manufacturing practice for measuring workpieces or other objects, particularly for determining the thickness, length, diameter or generally the distance between two surfaces. Such a distance may be sensed, for example, with the measuring and reference faces. A conventional precision measuring instrument has an electronic measuring system including a capacitive sensor device which detects the rotary motion or the angular position of the measuring spindle. The sensor device includes a stationary sensor element which is affixed to the housing and which forms a first electrode system. The sensor device further includes a movable sensor element which is secured to a bearing sleeve secured to the measuring spindle to rotate therewith and which faces the stationary sensor element. The movable sensor element forms a second electrode system. By means of precision-machined bearing seats between the sensor elements, a clearance having a width of about 0.1 mm is obtained. Dependent on the angular position, the two electrode systems overlap one another to a different extent, so that the angular position of the measuring spindle may be determined from the thus-formed differential capacitor. Capacitive sensors of this type have been widely used in both length measuring and angle measuring instruments.

For rotating the movable sensor element jointly with the measuring spindle and to further ensure a relative translational displacement therebetween, on the exterior of the measuring spindle a groove is provided which extends parallel to the rotary axis and which has a V-shaped cross section. A conical tip of a threaded pin extends into the groove. The pin is screwed into a collar of the bearing sleeve, to which the movable sensor element is secured, for example, by gluing.

Although the conventional micrometer outlined above has proven its worth, it does, nevertheless, have its shortcomings. For example, the required clearance width, by means of which a high resolution and measuring precision can be obtained, but at the same time an over-modulation and a non-linearity coupled therewith are avoided, is dependent from the system utilized in each instance. Thus, for different measuring systems different bearing sleeves have to be held available. Further, production-dependent shape and dimensional deviations of the bearing seats or tolerances in the sensor elements may lead to measuring inaccuracies. The requirements concerning a measuring accuracy, however, are stringent for such instruments. In micrometer gauges the measuring accuracy should be, for example, below one micron.

Furthermore it has been found that the guiding arrangement formed by the V-groove and the cone-tipped threaded pin also affect substantially the measuring accuracy. Alignment and depth deviations, which necessarily appear as the V-groove is ground, lead to mutual positional changes between the two sensor elements, thus giving rise to measuring errors. It is, however, extremely difficult to provide a groove on the jacket surface of the measuring sleeve in such an accurate manner that it is exactly parallel to the rotary axis and has a constant depth.

Also, disks of very small outer diameter have to be used for grinding the groove; such disks have a short service life, rendering the tools more expensive and thus increasing the manufacturing cost. It has further been found to be disadvantageous that only the conical tip of the threaded screw can serve as the final abutment for the end of the measuring range. Due to the groove geometry conical tip of the threaded screw is very delicate and is thus prone to overwinding.

It is therefore an object of the invention to provide a precision distance-measuring instrument of high measuring accuracy. In particular, the precision measuring instrument should be of robust and simple construction, it should be economical to manufacture and should be easy to assemble.

The above objects are accomplished by a precision measuring instrument having features defined in independent claims 1 and 10, respectively.

The distance-measuring precision instrument according to the invention has a measuring spindle guided and supported in a housing in such a manner that a given rotation results in a corresponding displacement of the measuring spindle along a measuring axis defined by the rotary axis of the measuring spindle. A sensor arrangement is provided for detecting the rotary motion of the measuring spindle. The sensor arrangement has a stationary sensor element which is immobile relative to the housing and a movable sensor element which is secured to the measuring spindle for rotation therewith. Between the stationary sensor element and the movable sensor element a clearance of predetermined width is provided. A guiding device serves for transmitting the rotary motion of the measuring spindle to the movable sensor element and for allowing, at the same time, the translational movement of the measuring spindle relative to the movable sensor element.

According to an aspect of the invention the guiding device is formed of a guiding sleeve connected to the movable sensor element for rotation therewith and a guiding member secured to the measuring spindle for rotation therewith. The inner wall of the guiding sleeve is provided with a precision-machined inner groove which extends parallel to the measuring axis and which has a substantially constant depth. The guiding member has a shape and a size which conform to the inner groove and extends displaceably thereinto. Thus, as a departure from the conventional micrometer, in the precision measuring instrument according to the invention the guiding groove is provided not on the external surface of the measuring spindle, but on the inner wall of the guiding sleeve which surrounds the measuring spindle and further, the guiding member is secured to the measuring spindle. By placing the location of engagement radially outward relative to the rotary axis, the play of the rotary angle between the movable sensor element and the measuring spindle is reduced, given the same play between the guiding member and the groove flanks. Shape and dimensional deviations of the guiding groove thus have a weaker effect than in the conventional micrometer, whereby the measuring accuracy of the entire system is increased. Conversely, a given accuracy allows for a higher tolerance in the manufacture of the structural components.

The guiding device is disposed advantageously entirely inside an inner housing space which also accommodates the sensor device. Since such an inner space may be sealed fluid tight by the housing, an adverse effect on the measuring results by dust or liquid particles which may otherwise cling to the guiding groove is avoided. In case of an arrangement of the guiding arrangement externally of the housing additional sealing means would be required.

According to an advantageous embodiment of the invention, the movable sensor element is secured directly to the guiding sleeve which then functions as a bearing sleeve. On the bearing sleeve a supporting location is formed which sets the position of the movable sensor element with precision.

The guiding groove may be provided in the inner wall of the guiding sleeve easily and with high precision. Particularly high precision in shape, dimensions and surface quality are obtained by broaching the inner groove, that is, by machining with a multi-tooth tool. The guiding sleeve may be held in an accurate position in a workpiece chuck and by means of a linear cutting motion an inner groove is obtained which excels by its very accurate parallelism to the bore, resulting in a high measuring precision. It is to be understood that the inner groove may also be made by cutting or by another suitable process.

The guiding member advantageously also constitutes a driving element which transmits the rotary motion of the measuring spindle to the movable sensor element. According to a preferred embodiment the guiding member is formed as a pin, particularly a threaded pin, radially affixed to the measuring spindle. The head of the pin projects beyond the external surface of the measuring spindle and extends into the guiding groove. The shape of the pin head is adapted with precision to the course of the guiding flanks, that is, to the cross-sectional shape of the guiding groove. Advantageously, for example, a rectangular groove and a circular-cylindrical pin head are provided. The outer diameter of the pin head corresponds to the groove width. In this manner bilateral, linear contact faces between the groove flanks and the guiding member are obtained which result in an smooth-running, accurate guidance For this purpose only simple, inexpensive means are needed. For facilitating the assembly, a throughgoing opening may be provided which extends radially through the wall of the guiding sleeve and which opens into the inner groove. Further, a removable housing lid may be provided for accessing the throughgoing opening to secure the guiding pin. It is to be understood that other shapes for the guiding groove and the pin head or other configurations of the guiding member are feasible.

The construction according to the invention provides a stable terminal abutment for the end of the measuring range which does not depend from the groove geometry. For example, to a collar of the bearing sleeve for the movable sensor element a pin may be secured which projects into the guiding groove and cooperates with the guiding member at the end of the measuring range. In this manner an overwinding may be avoided for all practical purposes.

According to a further aspect of the invention a precision measuring instrument is provided which comprises a rotatable and shiftable measuring spindle accommodated in a housing, and a sensor device arranged for detecting the rotary motion of the measuring spindle. The sensor device has a stationary sensor element and a movable sensor element which face one another and together define a clearance. The instrument further comprises a guiding device for guiding the relative translational movement between the movable sensor element and the measuring spindle. According to the invention a setting device is provided which serves to variably set the clearance width, that is, the distance between the sensor elements. Advantageously, a substantial parallelism exists between the sensor elements with respect to one another by virtue of positionally accurately machined bearing seats. To assume an initial state, the clearance width and preferably also the angular position of the sensor elements with respect to one another may be set by means of the setting device. For example, the clearance width may be set in such a manner dependent from the used measuring system (so that different measuring systems may be used), or dependent from the manufacturing tolerances of the sensor elements (so that manufacturing errors may be compensated for), or dependent from other individual requirements, that high-quality measuring signals may be obtained, while over-modulations are avoided. In this manner the measuring accuracy is significantly increased. Further, the clearance width may also be adjusted, for example, to flexibly compensate for the wear of the instrument components.

According to a preferred embodiment, both sensor elements are arranged in axial alignment at a small distance from one another. The axial distance between the sensor elements is varied by means of the setting device. It is, however, also feasible to use a sensor device in which the sensor elements are in a radial alignment. In such a case the setting device has to make possible a radial alignment of the cooperating sensor elements.

According to a further preferred embodiment, the setting device is associated with the stationary sensor element, while the position of the movable sensor element is determined by its bearing seat. In case the stationary sensor element forms part of an electronic measuring system arranged on a printed circuit board, the position of the printed circuit board is also set. It is, however, also feasible to associate the setting device solely with the movable sensor element or with both sensor elements.

In an actual structural embodiment of the invention the sensor elements are supported on respective bearing sleeves which have annular, axial bearing extensions that project axially toward one another and are in contact with one another with their end faces. In this manner a substantial parallelism between the sensor elements may be ensured. Further, both extensions have the same outer diameter, whereby an axial alignment of the sensor elements relative to one another is ensured. One of the sensor elements is preferably mounted on an annular carrier which is arranged snugly, but displaceably on the outside of the respective bearing extension. The bearing extension and the carrier thus serve as a positioning device for the sensor element.

With the setting device a locking device is associated for fixing the set position of the respective sensor element. A simple clamping device is obtained by providing in the displaceable carrier or carriers a throughgoing bore, such as a threaded bore. A pin, preferably a threaded pin, is introduced into the bore such that the pin extends to the outer surface of the cylindrical bearing extension for immobilizing the set position.

By means of any of the above-discussed measures according to the invention the measuring accuracy of the precision measuring instrument is significantly increased. According to a particularly advantageous embodiment both measures are present; that is, the precision measuring instrument includes a guiding device and a setting device as discussed earlier.

The precision measuring instrument according to the invention may be a micrometer, an internal thread micrometer, a precision clearance gauge, or similar measuring instrument. In case of an electronic internal thread micrometer, a length portion of the measuring spindle is provided with an external thread which is screwed into an inner thread of a screw-in sleeve. The screw-in sleeve is secured to the housing and preferably simultaneously serves as a bearing sleeve for one of the sensor elements, preferably for the stationary sensor element.

The stationary sensor element may form part of a measuring system which includes signal transmitting means and signal receiving means, while the movable sensor element preferably forms a coding means or a measure embodiment (scale), as it is known in sensors. The signal emitted by the signal transmitter is, by the measure embodiment, differently influenced dependent upon the relative angular position between the sensor elements and is applied to the signal receiver. It is also feasible to make one of the sensor elements the signal transmitter and the other the signal receiver. Preferred are capacitive measuring systems which need very little current and thus are particularly adapted as battery-operated, hand-held measuring instruments or inductive measuring systems which particularly resist to soiling. Other systems, for example, magnetostrictive or optical measuring systems may also be used.

Figure 3:
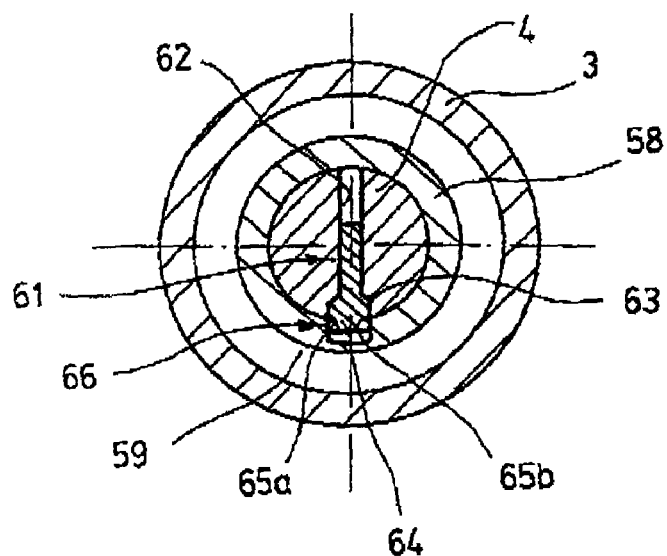
Figure 4:
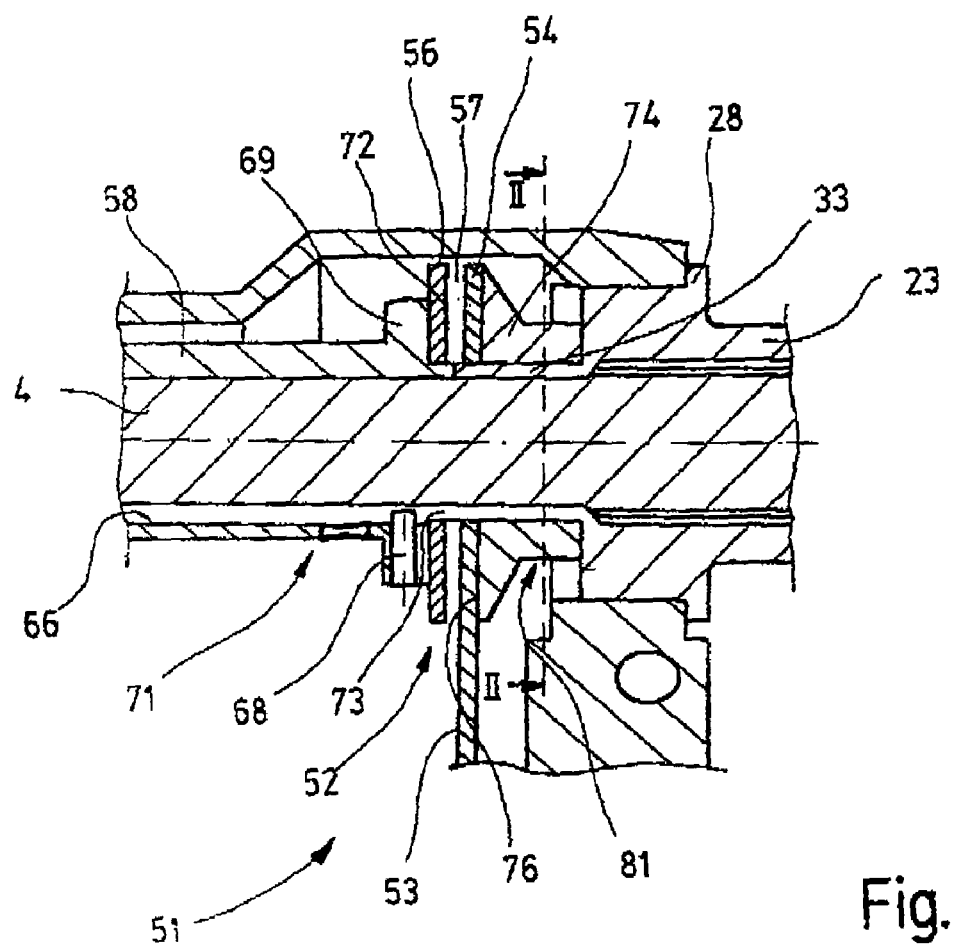
Figure 5:
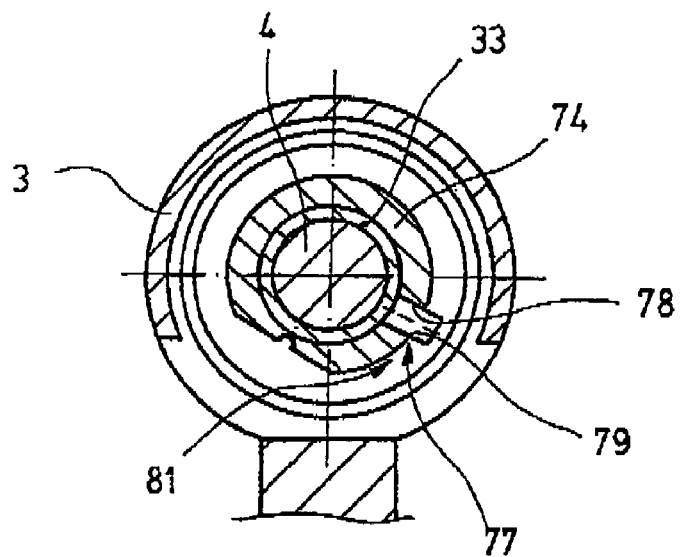
Figure 6:
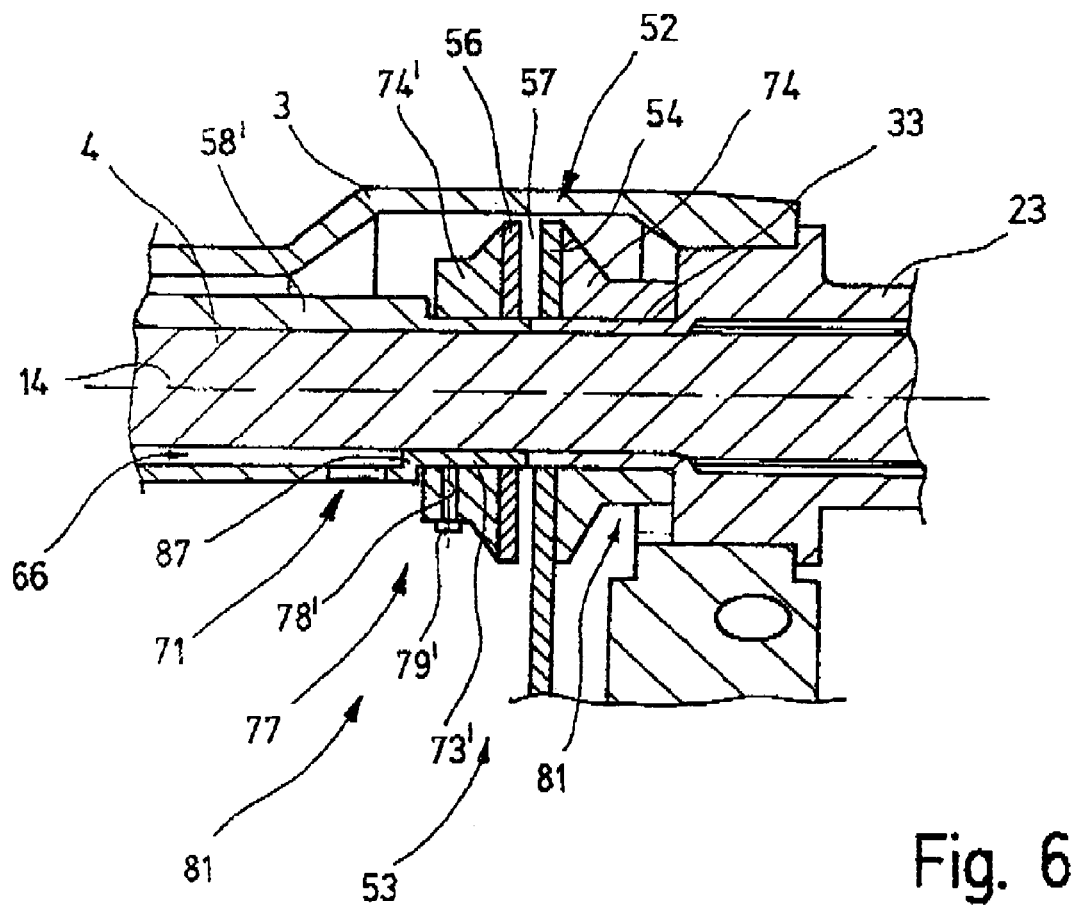

Further advantageous details of embodiments according to the invention will become apparent from the dependent claims and the description in conjunction with the drawing illustrating embodiments of the invention. In the drawing FIG. 1 is a schematic, perspective view of a precision measuring instrument according to the invention, FIG. 2 is a longitudinal sectional view of the precision measuring instrument, illustrating the individual functional units, shown partly in a substantially schematic manner, FIG. 3 is a cross-sectional view, on a different scale, taken along line I—I of FIG. 2 for illustrating the guiding device according to the invention, FIG. 4 is a magnified, fragmentary view of FIG. 2 for illustrating the guiding device according to the invention, FIG. 5 is a cross-sectional view taken along line II—II of FIG. 4 on an enlarged scale, and FIG. 6 is a longitudinal sectional view similar to FIG. 4, showing a modified embodiment of a precision measuring instrument according to the invention.

FIG. 1 shows a precision measuring instrument 1, also referred to as an internal thread micrometer or micrometer gauge, having a housing generally designated at 2 made, for example, of cast material and including a substantially cylindrical, central housing portion 3 The housing portion 3 accommodates an elongate measuring spindle 4, whose circular-cylindrical portion 6 projects leftward from the housing portion 3 as viewed in FIG. 1. At the other, right-hand end (as viewed in FIG. 1) of the measuring spindle 4 a barrel-shaped rotary grip 7 is provided, by means of which the spindle 4 may be rotated and simultaneously shifted along its rotary axis, as will be further described in more detail. As also seen in FIG. 1, underneath the cylindrical portion 3 the housing 2 has a substantially box-shaped base body 8 which is closed fluid tight by a housing lid 9 and a hook-shaped or L-shaped yoke 1 which carries an anvil 12 at its upward-extending free end in alignment with the spindle portion 6.

Figure 2:
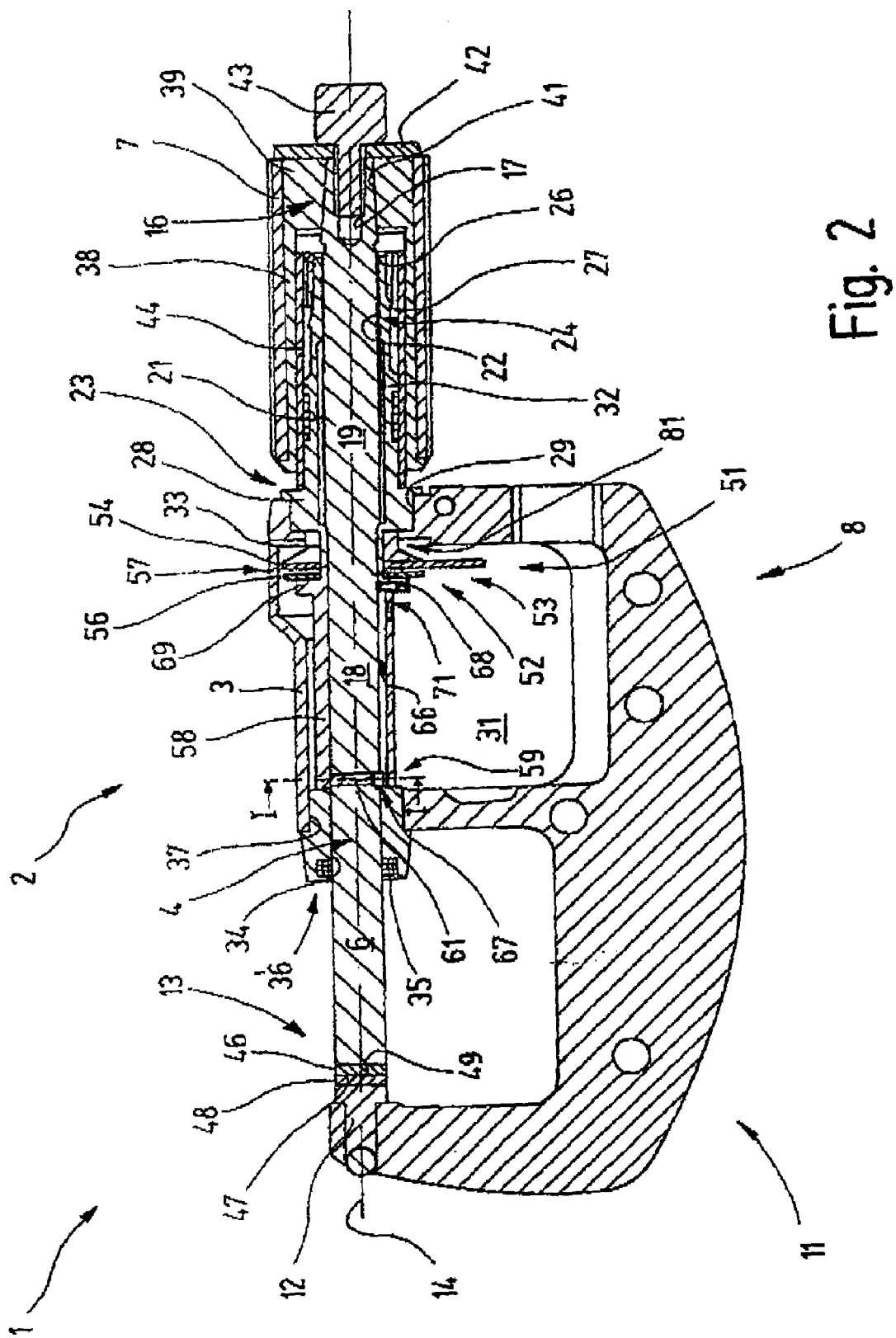

The measuring spindle 4 and further functional components are shown in detail in FIG. 2 which illustrates a longitudinal section of the precision measuring instrument 1 according to the invention. As seen, the measuring spindle 4 extends from its end 13, which is in engagement with the anvil 12, along its rotary axis or measuring axis 14 through the housing 2 to its other end 16. The spindle end 16 is frustoconical for securing the grip 7 and is provided with a blind bore 17 machined into the axial end face. Adjoining the portion 6, the measuring spindle 4 has a likewise cylindrical central portion 18, which in the illustration is situated inside the housing portion 3, and a threaded portion 19 between the central portion 18 and the conical end 16 The threaded portion 19 has an external thread 21 machined with high-precision.

The external thread 21 extends into a conforming inner thread 22 of an outward-projecting screw-in sleeve 23 secured to the housing 2. The inner thread 22 is provided only on a terminal portion 24 remote from the housing 2. The pitch of the threads 21 and 22 determines the longitudinal feed of the measuring spindle 4 for each revolution. On the terminal portion 24 a setting nut 26 may be mounted, by means of which the engagement force of the threads 21 and 22 may be set in such a manner that a thread play is substantially eliminated, yet an easy-going rotation of the measuring spindle 4 with respect to the screw-in sleeve 23 is ensured.

The screw-in sleeve 23 is secured in an opening 29 of the housing 2 by means of a mounting flange 28. Between the mounting flange 28 and the terminal portion 24 the screw-in sleeve 23 has a portion 32, whose inner diameter is greater than the outer diameter of the external thread 21 of the measuring spindle 4. On the mounting flange 28 an annular extension 33 is formed which extends axially into the inner space 31 of the housing 2. The outer diameter of the annular extension 33 is smaller than that of the mounting flange, while its inner diameter corresponds to the outer diameter of the portions 6, 18 of the measuring spindle 4. As a result, the measuring spindle 4 is snugly and slidably supported and guided by the extension 33. Further, the measuring spindle 4 is snugly and slidably supported in the inner bore 34 of a bearing bushing 36 which is inserted into an opening 37 of the housing 2. The opening 37 is located opposite the opening 29. The bearing bushing 36 is preferably glued into the opening 37 and has a seal 35 which surrounds the measuring spindle 4 for sealing the inner space 18 fluid tight, together with sealing means for the housing lid 9 and possibly with sealing means for a battery well, as well as with the accurately fitting threads 21, 22.

As noted earlier, the measuring spindle 4 may be screwed inward or outward by means of the grip 7. The grip 7 which is, in the present instance made as a plastic barrel, is pulled over a friction sleeve 38 and is frictionally secured thereto. The friction sleeve 38 has at its axial outer end a constriction 39 provided with a conical bore 41, which corresponds in shape and size to the frustoconical spindle end 16. The latter is received in the bore 41 while forming a frictional lock therewith. The plastic grip 7 and the friction sleeve 38 are secured in the axial direction by a cover disk 42 and a setscrew 43 which extends through a central bore of the cover disk 42 and is screwed into the blind bore 17. The setscrew 43 may also be used for a rapid adjustment of the measuring spindle 4, since its outer diameter is smaller than that of the grip 7. The friction sleeve 38 is arranged for rotation about a sleeve 44, which is secured to the mounting flange 28 of the screw-in sleeve 23 and which extends along the portions 32, 24.

The precision measuring instrument 1 serves for measuring distances between surfaces, for example, the thickness, length, diameter or other dimensions of workpieces. For this purpose, on the axial end face of the spindle portion 6 a wear-resistant measuring disk 46 is secured, which has a planar surface 47 oriented perpendicularly to the measuring axis 14 and functioning as a measuring surface Likewise, a wear-resistant disk 48 having a planar, circular reference surface 49 is secured to the anvil 12 which functions as a counter support. The reference surface 49 is oriented toward the measuring surface 47 and extends parallel thereto.

A measuring system generally designated at 51 and accommodated in the inner space 31 is provided for determining the distance between the reference surface 49 and the measuring surface 47. The measuring system 51 comprises a sensor device 52, which detects the relative angular position or rotary motion of the measuring spindle 4, as well as a control and evaluating device 53 which operates the sensor device 52 and which evaluates the measuring signals generated by the sensor device 52 for determining the distance to be ascertained. The sensor device 52 and the control and evaluating device 53 are not shown in detail in FIG. 2. It is recognizable, however, that the sensor device 52 comprises a stationary sensor element 54, which is immobile relative to the housing 2 and a movable sensor element 56, which rotates in unison with the measuring spindle 4.

In the illustrated embodiment a capacitive sensor device 52 is provided. The stationary sensor element 54 has, for example, a plurality of transmitter electrodes (not shown in detail) formed by segmented capacitor layers which are arranged on a circular ring on a surface facing the movable sensor element 56. A plurality of receiver electrodes, also formed of circular ring segments, are provided about the transmitter electrodes. The movable sensor element 56 is formed as a measure embodiment or coding means and has, on the surface facing the stationary sensor element 54, a plurality of counter electrodes which again, have the shape of circular ring segments and are spaced from the transmitter and receiver electrodes. Between the sensor elements 54, 56 a uniform, annular clearance 57 is provided, which in the present instance has a width of about 0.1 mm The control signals applied to the transmitter electrodes are in a known manner coupled capacitively by the counter electrodes of the movable sensor element 56 to the receiver electrodes. Dependent upon the extent of overlap between the counter electrodes and the transmitter or, respectively, the receiver electrodes, the control signals are differently affected or encoded. Thus, the measuring signals obtain information concerning the relative angular position of the measuring spindle 4. The evaluating device 53 extracts the information and determines the distance sought for based on the number and direction of revolutions of the measuring spindle 4 and the pitch of the spindle thread. Capacitive measuring systems of the briefly outlined type are well-known in prior art. An example of a preferred capacitive measuring system, which may be readily used as a rotary measuring system and which has an advantageous, low-consumption control and evaluating circuit, is described in detail in German patent document DE 100 351 92 C1, which is incorporated herein by reference.

The type of the measuring system is of no decisive significance as concerns the invention. It is merely of importance that the measuring system adapted for detecting the angular position or angular velocity of the measuring spindle have a sensor element 56 rotating together with the measuring spindle 4 and a stationary sensor element 54 arranged face-to-face at a predetermined distance from one another. For example, inductive measuring systems may be used as well in which the magnetic field generated by the transmitter coils is affected by the measure embodiment and detected by the receiver coils. Preferred types of inductive measuring systems are disclosed in European patent documents EP 0 785 415 B1, EP 0 182 085 B1 or German patent document DE 197 199 05 A1.

The movable sensor element 56 is secured to a bearing sleeve or guiding sleeve 58 which snugly, but relatively shiftably surrounds the measuring spindle 4. The bearing sleeve 58 extends from the bearing bushing 36 to the extension 33 of the screw-in sleeve 23. The length of the bearing sleeve 58 is preferably dimensioned such that its axial end faces are in contact with the axial end faces of the bearing bushing 36 and the axial extension 33 to provide for an immobilization in the axial direction. In this manner the position of the movable sensor element 56 too, is set.

A driving and guiding device generally designated at 59 illustrated in FIGS. 2 and 3 is provided for transmitting the rotary motion from the measuring spindle 4 to the bearing sleeve 58, on the one hand, but for permitting a relative translational motion therebetween, on the other hand. The device 59 includes a securing pin 61 which is screwed into a threaded radial bore 62, which passes through the cylindrical portion 18 of the measuring spindle 4 while perpendicularly intersecting the rotary axis 14. At its opening facing the surface of the portion 18, the radial bore 62 flares to form a countersunk opening 63, in which the cylindrical head 64 of the pin 61 is partially accommodated. A large portion of the pin head 64, however, projects beyond the upper surface of the measuring spindle 4 into an inner groove or guiding groove 66, which is formed in the bearing sleeve 58. The groove 66 has in the present instance a rectangular cross section and extends parallel to the rotary axis 14 along the entire length of the bearing sleeve 58. The outer diameter of the pin head 64 accurately corresponds to the width of the groove 66, whereby a linear contact is obtained at the groove flanks 65*a*, 65*b*. The inner groove 66 is preferably machined by broaching for obtaining the required shape and dimensional accuracy.

The securing pin 61 and the radial bore 62 are axially positioned such that the pin head 64 abuts the annular end face (projecting into the inner space 31) of the bearing bushing 36, which forms a first stop 67, when the measuring surface 47 and the reference surface 49 are in mutual contact. Also referring to FIG. 4, a pin 68 defining the end of the measuring range and constituting a second stop, extends radially through a radial flange 69 of the bearing sleeve 58 to the immediate vicinity of the surface of the measuring spindle 4 and projects into the guiding groove 66. Close to the radial flange 69, an opening 71 in the wall of the sleeve 58 provides for an access to the measuring spindle 4. The radial flange 69 simultaneously serves as a bearing seat for the movable sensor element 56 and has, for this purpose, a precision-machined engagement surface 72 which is oriented perpendicularly to the measuring axis 14 and to which the sensor element 56 is secured. The radial position of the sensor element 56 is set by an annular, axial projection 73, which extends from the radial flange 69 in the direction of the extension 33 of the screw-in sleeve 23 and is in contact therewith. The outer diameters of the axial extensions 33, 73 are identical.

As shown magnified in FIG. 4, on the cylindrical outer surface of the extension 33 a supporting or carrier ring 74 is provided, whose axial length is less than the axial length of the extension 33 and whose inner diameter essentially corresponds to the outer diameter of the extension 33, so that the supporting ring 74 sits snugly, but displaceably on the extension 33. The supporting ring 74 has an axial end face 76, which runs exactly parallel to the engagement surface 72 and to which the stationary sensor element 54 and a circuit board carrying the control and evaluating device 53 are secured.

Referring to FIG. 5, for setting the position of the supporting ring 74 a fixing or clamping device 77 is provided, by means of which the supporting ring 74 may be clamped to the cylindrical extension 33. The fixing or clamping device 77 includes an internally threaded radial bore 78 passing through the wall of the supporting ring 74 and a threaded pin 79 screwed into the bore 78 until it contacts the outer surface of the extension 33 and exerts a sufficient pressing force for securely holding the supporting ring 74.

The above-described precision measuring instrument 1 may be very rapidly and simply assembled because of its relatively few components. For example, after securing the screw-in sleeve 23 to the housing 2, the supporting ring 74 may be inserted on the axial extension 33 and subsequently the measuring spindle 4 may be passed through the screw-in sleeve 23 from the axial end 24 thereof until its frontal axial end portion 13 projects into the inner space 31. Thereafter the bearing sleeve 58 is together with the movable sensor element 56, inserted on the frontal end 13 of the measuring spindle 4 and the latter is shifted forward and aligned, until the radial bore 62 and the guiding groove 66 face the throughgoing opening 71. Then the securing pin 61 may be screwed through the throughgoing opening 71 into the bore 62. Thereafter the measuring spindle 4 may be passed through the bearing bore of the bearing bushing 36, at which time the external thread 21 of the measuring spindle 4 engages the inner thread 22 of the screw-in sleeve 23. Then the measuring spindle 4 may be screwed in until its measuring surface 47 arrives into contact with the reference surface 49.

It is a significant advantage that the sensor elements 64, 56 may be brought into alignment with one another as needed. The bearing seats 33, 76, as well as 72, 73 made with high precision already ensure a parallelism between the sensor elements 54, 56. The setting device 81 formed by the bearing extension 33, the supporting ring 74 and the fixing device 77 additionally make possible a setting of the angular position as well as the distance between the sensor elements according to requirements, for example, according to the specification relating to the utilized measuring system. Different measuring systems may be used without a change in configuration. Further, the clearance 57 may be individually adapted to the manufacturing tolerances or may be adjusted during service. The supporting ring 74 is simply displaced on the extension 33 into the required position and then immobilized there by tightening the screw 79. The required clearance width may be predetermined or may be set, for example, by measuring a reference object. It is also feasible to pick up measuring signals from the circuit board 53 and to determine the required clearance width based on qualitative information. In any event, the setting device 81 makes possible a flexible adaptation of the clearance width such that at all times a high measuring precision is ensured.

The precision measuring instrument 1 operates as follows:

The starting point of the operational description is the initial state illustrated in FIGS. 1 and 2, according to which the measuring surface 47 lies on the reference surface 49. The measuring instrument 1 may be energized by an on-switch 82 (shown in an exemplary manner), or by means of a wake-up circuit, which activates the measuring system 51, as soon as the grip 7 is actuated. Further, the precision measuring instrument 1 includes a reset button 83 for resetting the measuring system 51 and for setting to zero an indicating device, such as a display 84 which shows the measured distance in mm. If subsequently the measuring spindle 4 is rotated by means of the grip 7 or the rapid adjusting screw 43, the sensor device 52 detects the angular position of the measuring spindle 4 in the above-described manner. The evaluating device 53 evaluates the measuring signals delivered by the sensor device 52 and determines therefrom the distance between the measuring surface 47 and the reference surface 49, by means of which a dimension, for example, the thickness or length of a workpiece is picked up. FIG. 1 further shows a pivotal member 86, by means of which a non-illustrated immobilizing device may be activated to freeze the detected dimension and to prevent a further displacement of the measuring spindle 4. The determined distance is indicated on the display 84 and may be applied to a computer or the like from a data output terminal 87. Other signals, for example, measuring signals may also be transmitted by the data output terminal 87.

Upon rotating the measuring spindle 4, the latter is simultaneously displaced axially, that is, parallel to its rotary axis 14. During this occurrence, the head 64 of the securing pin 61 exerts a force on one of the groove flanks 65*a* or 65*b*, whereby the bearing sleeve 58 is, together with the movable sensor element and the measuring spindle 4, rotated and held in an angle-true manner. An axial displacement of the bearing sleeve 58 is prevented by a sliding contact between the end faces of the extension 33 and the bearing bushing 36. The pin head 64, which conforms accurately to the guiding groove 66, glides along the groove flanks 65*a*, 65*b* without a play that would adversely affect the measuring accuracy and without impeding an easy run of the components. The guiding device 59 is advantageously arranged in the region of the central spindle portion 18, that is, in the fully fluid tight inner space 31 of the housing 2, so that apart from the already-noted sealing means no additional seals have to be provided for the guiding device 59. Neither dust nor liquid particles can adversely affect the guidance. An accurate drive and guidance by the device 59 and a detection of an accurately set clearance 57 form the basis for a high-precision measurement.

It is a further advantage that a stable abutment is provided with the pin 68 upon its contact with the pin head 64 when the end of the measuring range is reached. The pin 68 is independent from the geometry of the groove 66 and has a sufficient thickness and strength for effectively preventing an over-winding. In the opposite direction the abutment 67, that is, the end face of the bearing bushing 36, prevents a damaging of the measuring surface 47 or the reference surface 49. In the grip 7, however, a ratchet-type device may be additionally provided to protect against over-winding.

Numerous modifications are feasible within the scope of the invention. As noted earlier, instead of a capacitive measuring system an inductive measuring system may be used. The precision measuring instrument 1 is preferably a battery-operated, hand-held measuring instrument, but may also be integrated into a measuring apparatus having a housing configuration different from the one illustrated. The measuring spindle 4 may be motor-driven, for example with the intermediary of a gearing. The measuring and reference surfaces 47, 49 may be spherical or conical dependent on the measuring purpose or may be arranged for receiving suitable measuring inserts. Further, the pin 61 may be replaced by a differently configured guiding member or the pin head may have a polygonal or other shape provided that a snug rotary entrainment and a relative shifting motion between the elements 4 and 58 are made possible. The described embodiment of the guiding device 59, however, excels in that it contributes to an increase of the measuring accuracy merely with simple means and measures. This also applies to the setting device 81 which, as described, is likewise of particularly simple construction and operability.

FIG. 6 shows a sectional view similar to FIG. 3, illustrating a modified embodiment of the invention. In instances where the modified embodiment is, in structure and function, identical to the earlier-described measuring instrument, the same reference numerals are used, and the above description is referred to.

The embodiment shown in FIG. 6 differs from that of FIGS. 1 to 5 only in that both sensor elements 54, 56 are displaceable along the measuring axis 14. While the supporting ring 74 of the stationary sensor element 54 may be immobilized in its axial and rotary position on the axial extension 33 of the screw-in sleeve 23 by the setting device 81, a corresponding setting device 81' is associated also with the movable sensor element 56. The sensor element 56 is affixed to a supporting or carrier ring 74' which sits snugly and displaceably on the axial extension 73' of the bearing sleeve 58'. The axial extension 73' is axially prolonged relative to the extension 73 of FIGS. 2 and 3 and the annular radial flange 69 of that embodiment is dispensed with. The guiding groove 66 extends only to the height of the throughgoing opening 71, and its end defines a step 87, which functions as an abutment for the pin head 64 when the end of the measuring range is reached. The extension 73' extends axially from the step 87 to the extension 33 and has the same outer diameter as the latter. The setting device 81', similarly to the setting device 81, has a clamping device 77', which comprises a radial bore 78' in the supporting ring 74' and a threaded pin 79'. The threaded pin 79' may be screwed in up to the outer circumferential surface of the extension 73'. The embodiment according to FIG. 6 offers more flexibility, inasmuch as it allows an attachment and replacement of a desired sensor element 54 or 56 and permits an adaptation to widely different measuring systems. It is to be understood that embodiments are feasible in which only the movable sensor element 56 is adjustable in its position, while the stationary sensor element 54 may be rigidly affixed, for example, to the screw-in sleeve 23.

A distance-measuring precision instrument 1 has a threaded measuring spindle 4 supported in a housing 2, a sensor device 62 which detects the rotary motion of the measuring spindle 4 and which has a stationary sensor element 54 immobile relative to the housing and a movable sensor element 56 secured to the measuring spindle for rotation therewith. Between the two sensor elements 54, 56 a clearance of predetermined width is provided. The instrument 1 further includes a driving and guiding device 59 for transmitting the rotary motion of the measuring spindle 4 to the movable sensor element 56 and for guiding a relative translational movement between the two.

According to the invention the driving and guiding device 59 has a guiding sleeve 58 which is affixed to the movable sensor element 56 for rotation therewith and which is provided with an inner groove 66 extending parallel to the measuring axis 14. The device 59 further includes a guiding member 61 coupled to the measuring spindle 4 for rotation therewith. The guiding member 61 conforms in shape and size to the inner groove 66 and extends shiftably thereinto. According to a further aspect of the invention a setting device 81 is provided, by means of which the clearance width between the sensor elements 45, 56 may be set as required. The precision measuring instrument 1 according to the invention has a simple and robust structure and ensures a high measuring accuracy.

The invention claimed is:

1. A precision distance measuring instrument comprising:
a housing defining a measuring axis,
a measuring spindle disposed rotatably and shiftably in the housing in such a manner that a certain rotary motion of the measuring spindle results in a corresponding shift of the measuring spindle along the measuring axis,
a sensor device for detecting the rotary motion of the measuring spindle; the sensor device has a stationary sensor element which is immobile relative to the housing and a movable sensor element which is connected to the measuring spindle to rotate therewith and which is shiftable relative to the measuring spindle along the measuring axis; between the stationary sensor element and the movable sensor element a clearance of predetermined width is set, and
a guiding device for guiding the relative shifting motion between the movable sensor element and the measuring spindle; the guiding device includes a guiding sleeve connected to the movable sensor element for rotation therewith; the guiding sleeve has an inner groove which extends parallel to the measuring axis and a guiding member which is connected to the measuring spindle for rotation therewith and which projects shiftably into the inner groove.

2. The precision measuring instrument as defined in claim 1, wherein the guiding device is also arranged as a driving device for co-rotating the movable sensor element upon rotation of the measuring spindle.

3. The precision measuring instrument as defined in claim 1, wherein the guiding device is accommodated entirely within an inner space which is surrounded by a hermetically closable housing and which contains the sensor device.

4. The precision measuring instrument as defined in claim 1, wherein the guiding sleeve constitutes a bearing sleeve directly carrying the movable sensor element.

5. The precision measuring instrument as defined in claim 1, wherein the inner groove is machined into the inner wall of the guiding sleeve by broaching.

6. The precision measuring instrument as defined in claim 1, wherein the inner groove is a rectangular groove.

7. The precision measuring instrument as defined in claim 1, wherein the guiding sleeve contains a radial throughgoing aperture which opens into the inner groove.

8. The precision measuring instrument as defined in claim 1, wherein the guiding member is formed by a pin which is secured to the measuring spindle; the threaded pin projects in the radial direction beyond the outer surface of the measuring spindle and has a head accurately fitting to the guiding groove.

9. The precision measuring instrument as defined in claim 1, wherein with the guiding member a terminal abutment is associated which is formed by a pin which, in the vicinity of the movable sensor element, extends through the guiding sleeve and projects into the guiding groove.

10. The precision distance measuring instrument as defined in claim 1, further comprising:
a setting device for variably setting the width of the clearance between the stationary sensor element and the movable sensor element.

11. The precision measuring instrument as defined in claim 10, wherein the movable sensor element and the stationary sensor element face each other in the axial direction at a small distance.

12. The precision measuring instrument as defined in claim 10, wherein the setting device is associated with the stationary sensor element.

13. The precision measuring instrument as defined in claim 10, wherein the setting device includes a fixing device which serves for fixing the set axial position and angular position of one of the sensor elements.

14. The precision measuring instrument as defined in claim 13, wherein the fixing device is formed by a radial threaded bore provided in the carrier and a threaded pin which may be screwed into the threaded bore up to the outer surface of a cylindrical bearing extension.

15. The precision measuring instrument as defined in claim 1, wherein the stationary sensor element forms part of a measuring system which has signal transmitting means and signal receiving means and the movable sensor element is formed by a coding means.

16. The precision measuring instrument as defined in claim 1, wherein the sensor device is a capacitive sensor device.

17. The precision measuring instrument as defined in claim 1, further comprising an evaluating device which evaluates the measuring signals delivered by the sensor device and delivers a measuring magnitude characterizing the axial shift of the measuring spindle.

18. The precision measuring instrument as defined in claim 1, further comprising a display device to display the axial shift of the measuring spindle for external observation.

19. A precision distance measuring instrument comprising:
a housing defining a measuring axis,
a measuring spindle disposed rotatably and shiftably in the housing in such a manner that a certain rotary motion of the measuring spindle results in a corresponding shift of the measuring spindle along the measuring axis,
a sensor device for detecting the rotary motion of the measuring spindle; the sensor device has a stationary sensor element which is stationary relative to the housing and a movable sensor element which is connected to the measuring spindle to rotate therewith and which is shiftable relative to the measuring spindle along the measuring axis; between the stationary sensor element and the movable sensor element a clearance of predetermined width is set,
a guiding device for guiding the relative shifting motion between the movable sensor element and the measuring spindle, and
a setting device for variable setting the width of the clearance between the stationary sensor element and the movable sensor element.
wherein the sensor elements are supported on bearing sleeves having annular axial bearing extensions which have essentially identical outer diameters and which extend toward one another in the axial direction and contact one another with their end faces.

20. The precision measuring instrument as defined in claim 19, wherein at least one of the sensor elements is secured to an annular carrier which concentrically surrounds the annular bearing extension of the respective bearing sleeve and is arranged shiftably thereon.

21. The precision measuring instrument as defined in claim 19, wherein one of the bearing sleeves supporting one of the sensor elements is a screw-in sleeve having a portion provided with an inner thread and that the measuring spindle is, at least along a portion, provided with an external thread which engages into the inner thread.

22. A precision distance measuring instrument comprising:
a housing defining a measuring axis,
a measuring spindle disposed rotatably and shiftably in the housing in such a manner that a certain rotary motion of the measuring spindle results in a corresponding shift of the measuring spindle along the measuring axis,
a sensor device for detecting the rotary motion of the measuring spindle; the sensor device has a stationary sensor element which is stationary relative to the housing and a movable sensor element which is connected to the measuring spindle to rotate therewith and which is shiftable relative to the measuring spindle along the measuring axis; between the stationary sensor element and the movable sensor element a clearance of predetermined width is set,
a guiding device for guiding the relative shifting motion between the movable sensor element and the measuring spindle, and
a setting device for variably setting the width of the clearance between the stationary sensor element and the movable sensor element,
wherein the guiding device comprises a guiding sleeve connected to the movable sensor element for rotation therewith; the guiding sleeve has an inner groove which extends parallel to the measuring axis and a guiding member which is connected to the measuring spindle for rotation therewith and which projects shiftably into the inner groove.

* * * * *